United States Patent
Kang et al.

(10) Patent No.: US 11,036,629 B2
(45) Date of Patent: Jun. 15, 2021

(54) CONTROLLER, MEMORY SYSTEM AND OPERATING METHOD THEREOF

(71) Applicant: SK hynix Inc., Icheon (KR)

(72) Inventors: Hye Mi Kang, Seongnam (KR); Eu Joon Byun, Yongin (KR)

(73) Assignee: SK hynix Inc., Icheon (KR)

( * ) Notice: Subject to any disclaimer, the term of this patent is extended or adjusted under 35 U.S.C. 154(b) by 4 days.

(21) Appl. No.: 16/729,198

(22) Filed: Dec. 27, 2019

(65) Prior Publication Data

US 2020/0409834 A1    Dec. 31, 2020

(30) Foreign Application Priority Data

Jun. 27, 2019  (KR) .................. 10-2019-0076928

(51) Int. Cl.
  *G06F 12/02*        (2006.01)
  *G06F 12/0873*      (2016.01)
  *G06F 12/0808*      (2016.01)
  *G06F 11/07*        (2006.01)
  *G06F 11/30*        (2006.01)
  *G06F 12/0882*      (2016.01)

(52) U.S. Cl.
  CPC ........ *G06F 12/0246* (2013.01); *G06F 11/076* (2013.01); *G06F 11/3037* (2013.01); *G06F 12/0253* (2013.01); *G06F 12/0808* (2013.01); *G06F 12/0873* (2013.01); *G06F 12/0882* (2013.01); *G06F 2212/7201* (2013.01); *G06F 2212/7211* (2013.01)

(58) Field of Classification Search
  None
  See application file for complete search history.

(56) References Cited

U.S. PATENT DOCUMENTS

| | | | |
|---|---|---|---|
| 10,261,725 B2* | 4/2019 | Hashimoto | G06F 3/0652 |
| 2007/0186065 A1* | 8/2007 | Lee | G06F 3/0656 |
| | | | 711/159 |
| 2008/0126712 A1* | 5/2008 | Mizushima | G06F 12/0246 |
| | | | 711/141 |
| 2010/0250893 A1* | 9/2010 | Cummins | G06F 12/0253 |
| | | | 711/203 |
| 2019/0004964 A1* | 1/2019 | Kanno | G06F 3/064 |

FOREIGN PATENT DOCUMENTS

| | | | |
|---|---|---|---|
| KR | 20120102923 A | 9/2012 | |
| KR | 101774496 B1 | 9/2017 | |
| WO | WO-2012121559 A2 * | 9/2012 | G06F 3/061 |

\* cited by examiner

*Primary Examiner* — Kevin Verbrugge

(57) ABSTRACT

In accordance with an embodiment of the present disclosure, a method of a controller for controlling a nonvolatile memory device including a plurality of data storage regions may include: determining, in response to a first copy event of receiving from a host a command instructing copy of data from a first logical address into a second logical address, whether a second copy event of copying the data from a first data storage region having a first physical address mapped to the first logical address into a data storage region having another physical address will occur; and in response to determining that the second copy event will not occur, changing a logical address mapped to the first physical address from the first logical address to the second logical address and invalidating the first logical address.

18 Claims, 7 Drawing Sheets

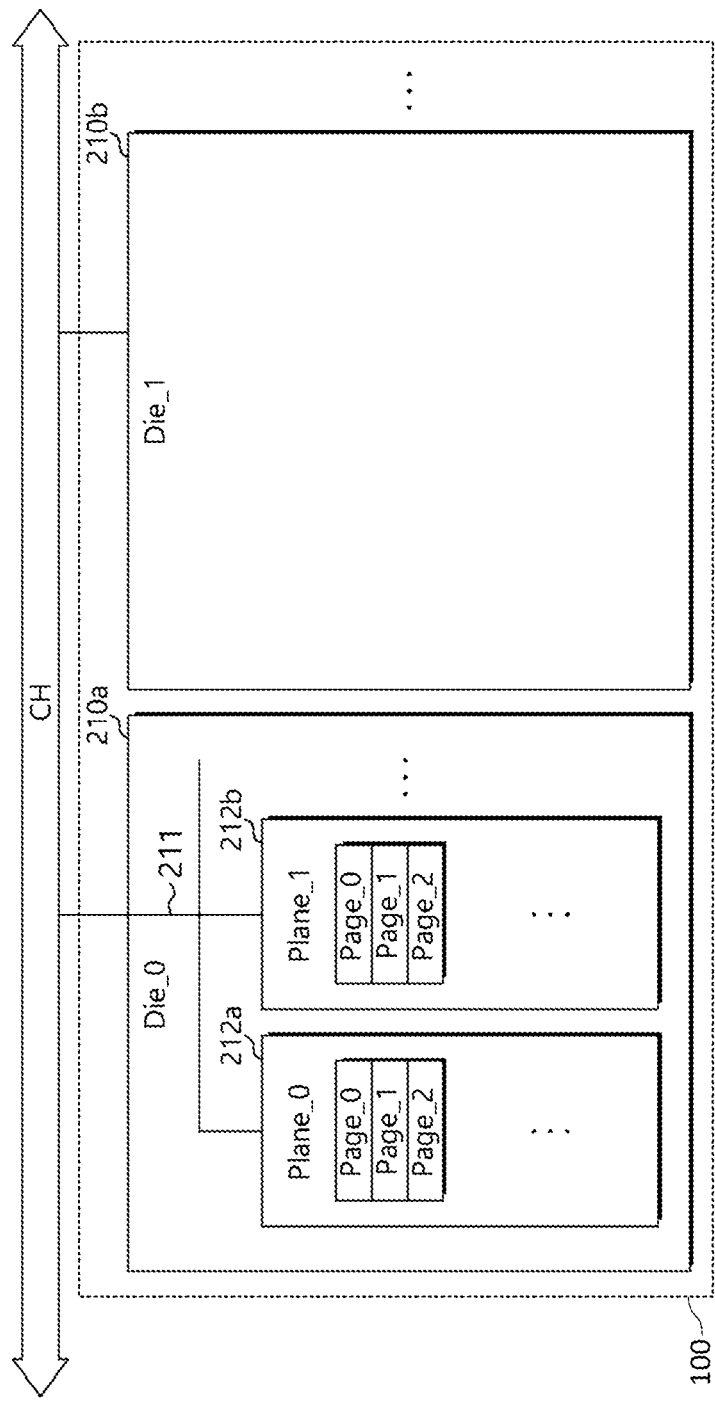

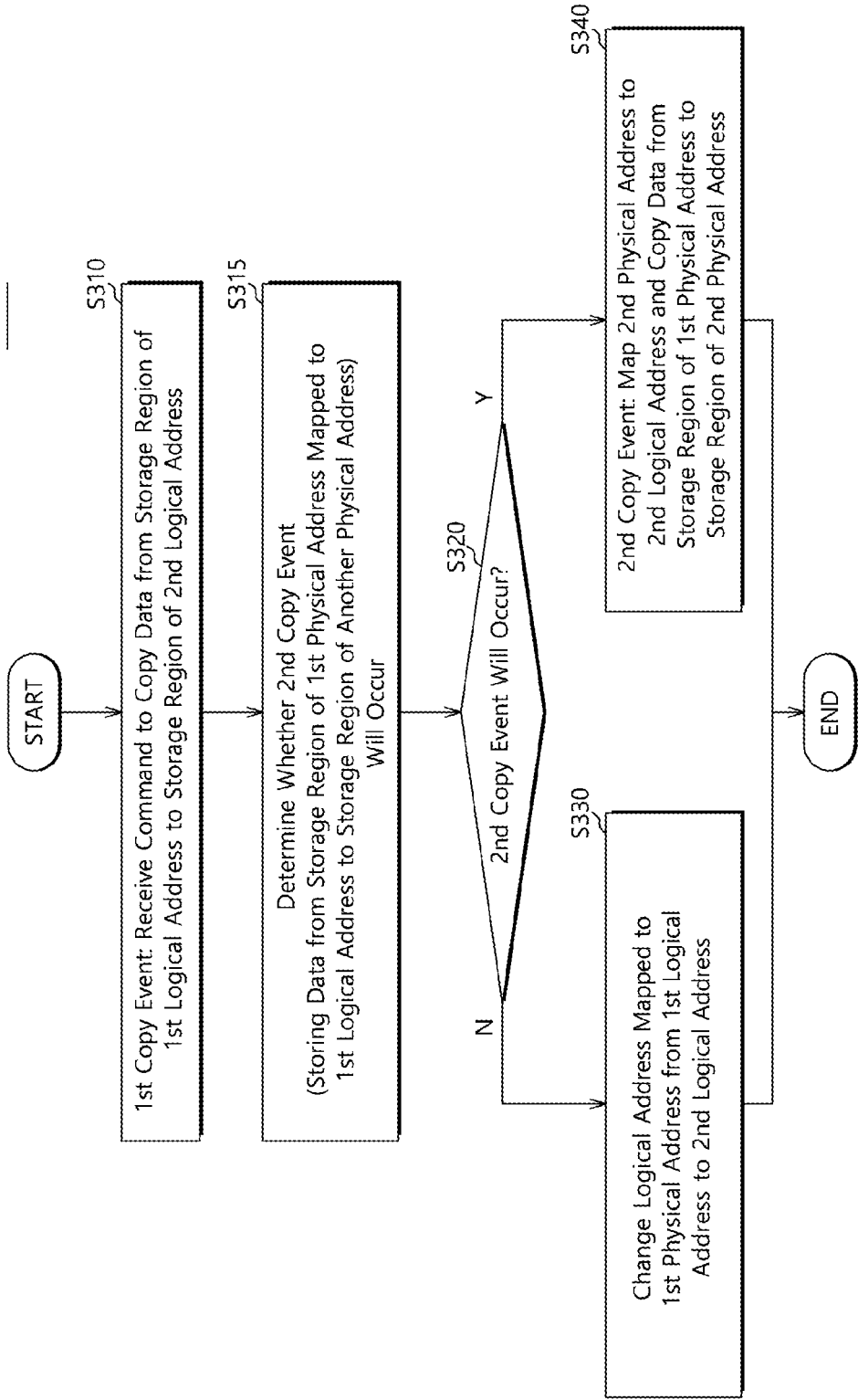

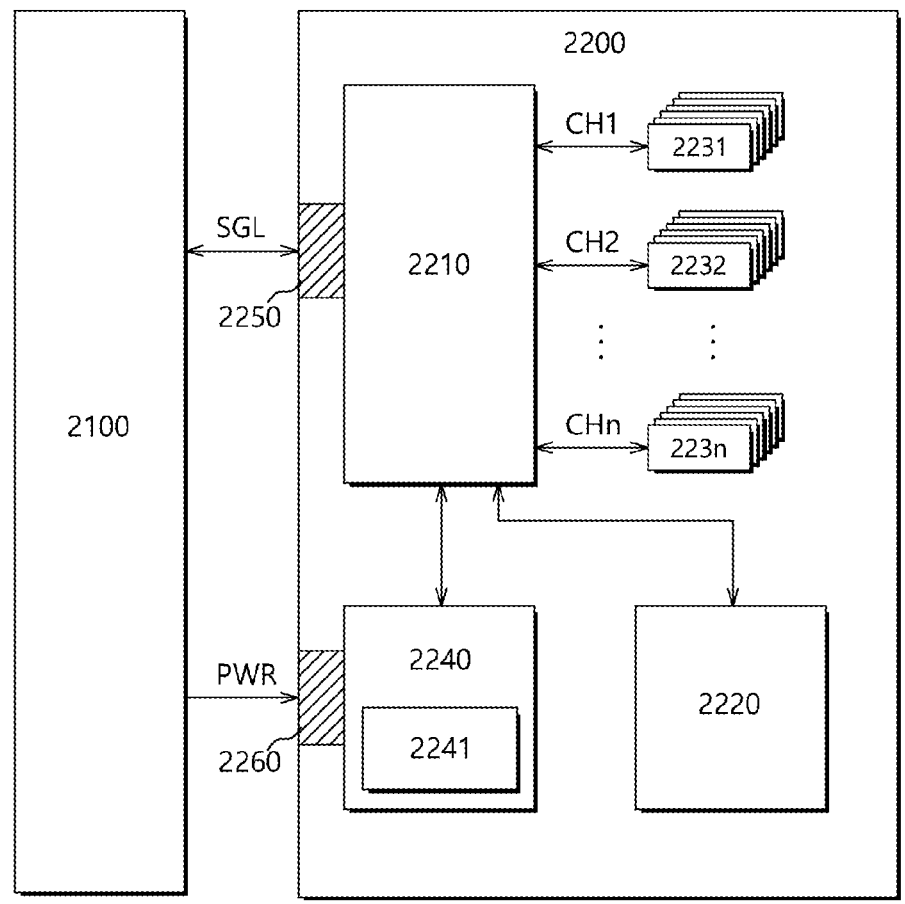

CONTROLLER, MEMORY SYSTEM AND OPERATING METHOD THEREOF

CROSS-REFERENCES TO RELATED APPLICATION

The present application claims priority under 35 U.S.C. § 119(a) to Korean application number 10-2019-0076928, filed on Jun. 27, 2019, in the Korean Intellectual Property Office, which is incorporated herein by reference in its entirety as set forth in full.

BACKGROUND

1. Technical Field

Various embodiments generally relate to a semiconductor device, and more particularly, to a controller, a memory system and an operating method of the controller.

2. Related Art

Recently, the paradigm for the computing environment has changed to the ubiquitous computing environment in which computer systems can be used anytime anywhere. Therefore, the use of portable electronic devices such as a mobile phone, digital camera and notebook computer has rapidly increased. Such a portable electronic device generally uses a memory system using a memory device. The memory system is used to store data used in the portable electronic device.

Since the memory system using a memory device has no mechanical driver, the data storage device has excellent stability and durability, exhibits high information access speed, and has low power consumption. Examples of the memory system having such advantages include a universal serial bus (USB) memory device, a memory card having various interfaces, a universal flash storage (UFS) device, and a solid state drive (SSD).

SUMMARY

Various embodiment of the present disclosure provides a technology capable of improving the performance of a memory system.

In accordance with an embodiment of the present disclosure, a method of a controller for controlling a nonvolatile memory device including a plurality of data storage regions may include: determining, in response to a first copy event of receiving from a host a command instructing copy of data from a first logical address into a second logical address, whether a second copy event of copying the data from a first data storage region having a first physical address mapped to the first logical address into a data storage region having another physical address will occur; and in response to determining that the second copy event will not occur, changing a logical address mapped to the first physical address from the first logical address to the second logical address and invalidating the first logical address.

In accordance with an embodiment of the present disclosure, a memory system may include: a nonvolatile memory device including a plurality of data storage regions; and a controller configured to control the nonvolatile memory device, wherein the controller is configured to: determine, in response to a first copy event of receiving from a host a command instructing copy of data from a first logical address into a second logical address, whether a second copy event of copying the data from a first data storage region having a first physical address mapped to the first logical address into a data storage region having another physical address will occur; and in response to determining that the second copy event will not occur, change a logical address mapped to the first physical address from the first logical address to the second logical address and invalidate the first logical address, when the second copy event is predicted not to occur.

In accordance with an embodiment of the present disclosure, a memory system may include: a nonvolatile memory device including a plurality of memory blocks each having a plurality of data storage regions; and a controller configured to, in response to a command instructing change of a logical address corresponding to data from a first logical address to a second logical address, determine whether a copy event on the data will occur; and, in response to determining that the copy event will not occur, map a first physical address that is mapped to the first logical address to the second logical address and invalidate the first logical address.

In accordance with an embodiment of the present disclosure, it is possible to improve the performance of a memory system.

BRIEF DESCRIPTION OF THE DRAWINGS

Features, aspects and embodiments are described in conjunction with the attached drawings, in which:

FIG. 2 illustrates a configuration of a data storage region included in a nonvolatile memory device in accordance with an embodiment of the present disclosure;

FIG. 3 is a flowchart illustrating an operation of a memory system in accordance with an embodiment of the present disclosure; and FIG. 4 illustrates an operation of a memory system in accordance with an embodiment of the present disclosure.

FIG. 5 illustrates of a data processing system including a solid state drive (SSD) in accordance with an embodiment of the present disclosure;

DETAILED DESCRIPTION

Figure 1:
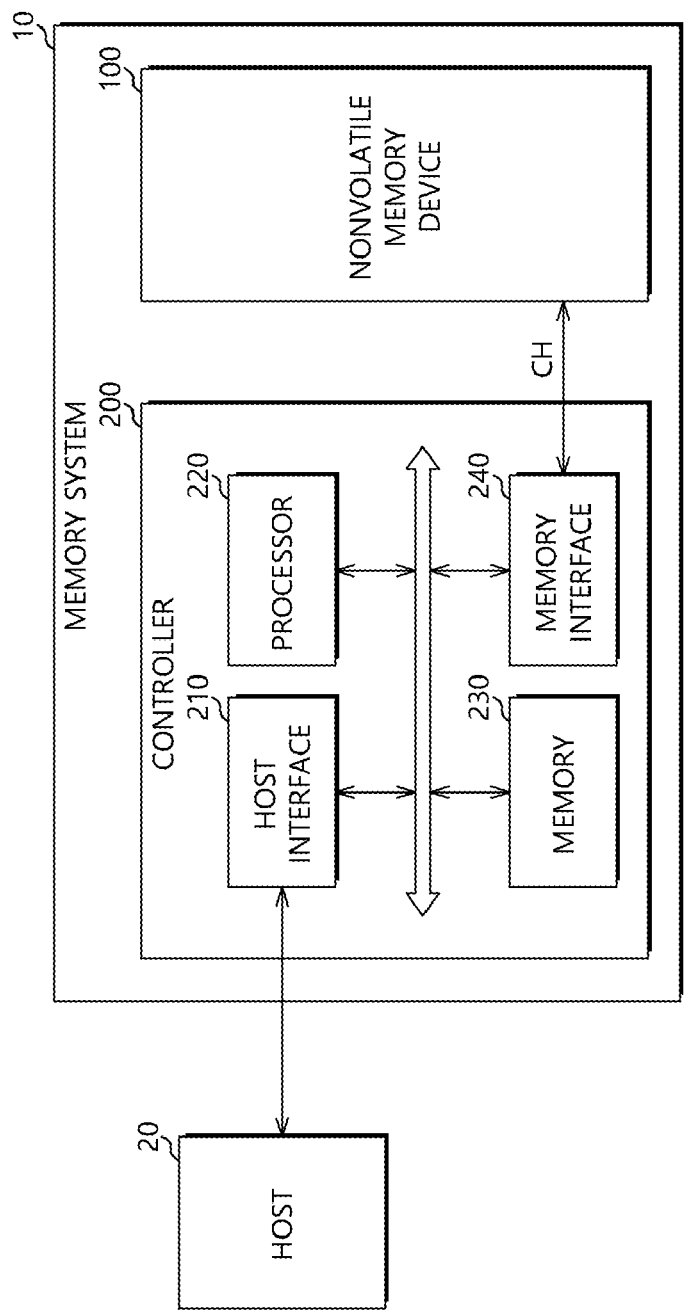
FIG. 1 illustrates a configuration of a memory system in accordance with an embodiment of the present disclosure.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

It will be understood that when an element is referred to as being "connected to", or "coupled to" another element, it may be directly on, connected to, or coupled to the other element, or one or more intervening elements may be present. It will be understood that the terms "comprises," "comprising," "includes," and "including" when used in this specification, specify the presence of the stated elements and do not preclude the presence or addition of one or more other elements.

Hereinafter, various embodiments of the present disclosure will be described with reference to the accompanying drawings. Throughout the disclosure, like reference numerals refer to like parts throughout the various figures and embodiments of the present invention. Detailed description of functions and structures well known to those skilled in the art will be omitted to avoid obscuring the subject matter of the present disclosure.

Hereinafter, illustrative embodiments of the present disclosure will be described below with reference to the accompanying drawings.

FIG. 1 illustrates a configuration of a memory system 10 in accordance with an embodiment of the present disclosure.

The memory system 10 may store data to be accessed by a host 20 such as a mobile phone, an MP3 player, a laptop computer, a desktop computer, a game player, a television (TV), an in-vehicle infotainment system, and the like.

The memory system 10 may be manufactured as any one among various types of storage devices according to an interface protocol coupled to the host 20. For example, the memory system 10 may include any one of various types of storage devices, such as a solid state drive (SSD), a multimedia card in the forms of MMC, eMMC, RS-MMC and micro-MMC, a secure digital card in the forms of SD, mini-SD and micro-SD, a universal serial bus (USB) storage device, a universal flash storage (UFS) device, a storage device of the type of a personal computer memory card international association (PCMCIA) card, a storage device of the type of a peripheral component interconnection (PCI), a storage device of the type of a PCI-express (PCI-E), a compact flash (CF) card, a smart media card, a memory stick, and the like.

The memory system 10 may be manufactured as any one among various types of packages. For example, the memory system 10 may be manufactured as any one of a package on package (POP), a system in package (SIP), a system on chip (SOC), a multi-chip package (MCP), a chip on board (COB), a wafer-level fabricated package (WFP), and a wafer-level stack package (WSP).

The memory system 10 may include a nonvolatile memory device 100 and a controller 200.

The nonvolatile memory device 100 may operate as a storage medium of the memory system 10. According to a memory cell included in the nonvolatile memory device 100, the nonvolatile memory device 100 may be implemented as one among various nonvolatile memory device such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, a resistive random access memory (ReRAM) using a transition metal compound, and so forth.

Although FIG. 1 shows the memory system 10 including a single nonvolatile memory device 100 for clear description, the memory system 10 may include a plurality of nonvolatile memory devices 100 and the scope of the present disclosure may cover the memory system 10 including a plurality of nonvolatile memory devices 100.

The nonvolatile memory device 100 may include a memory cell array (not shown) including a plurality of memory cells arranged at cross points between a plurality of word lines (not shown) and a plurality of bit lines (not shown). The memory cell array may include a plurality of memory blocks each including a plurality of pages.

For example, each of the memory cells in the memory cell array may be used as a single level cell (SLC) capable of storing 1-bit data and/or as a multi-level cell (MLC) capable of storing data of 2 or greater bits. A memory cell capable of 2-bit data may be referred to as a multi-level cell (MLC), a memory cell capable of 3-bit data may be referred to as a triple level cell (TLC), and a memory cell capable of 4-bit data may be referred to as a quadruple level cell (QLC).

The memory cell array may include at least one of the SLC and the MLC. The memory cell array may include memory cells arranged in a two-dimensional (e.g., horizontal) structure or memory cells arranged in a three-dimensional (e.g., vertical) structure.

The controller 200 may control general operations of the memory system 10 by driving firmware or software loaded in the memory 230. The controller 200 may decode and execute instructions or algorithms expressed as code, such as firmware or software. The controller 200 may be implemented as hardware or combination of hardware and software.

The controller 200 may include a host interface 210, a processor 220 and a memory interface 240. Although not illustrated in FIG. 1, the controller 200 may further include an error correction code (ECC) engine configured to generate a parity by ECC-encoding write data provided from the host 20 and to ECC-decode read data read from the nonvolatile memory device 100 using the parity.

The host interface 210 may interface the host 20 and the memory system 10 according to a protocol of the host 20. For example, the host interface 210 may communicate with the host 20 through any one among a universal serial bus (USB) protocol, a universal flash storage (UFS) protocol, a multimedia card (MMC) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, and a PCI express (PCI-E) protocol.

The processor 220 may comprise a micro control unit (MCU) and/or a central processing unit (CPU). The processor 220 may process requests transmitted from the host 20. To process the requests transmitted from the host 20, the processor 220 may perform an instruction or algorithm expressed in code (for example, firmware) loaded into the memory 230 and control internal function blocks such as the host interface 210, the memory 230 and the memory interface 240 and the nonvolatile memory device 100.

The processor 220 may generate control signals for controlling operations of the nonvolatile memory device 100 based on the requests transmitted from the host 20 and may provide the generated control signals to the nonvolatile memory device 100 through the memory interface 240.

The memory 230 may include a read only memory (ROM) and a random access memory such as a dynamic random access memory (DRAM) or a static random access memory (SRAM). The memory 230 may store the firmware to be executed by the processor 220. The memory 230 may also store data (for example, meta data) required for driving of the firmware. That is, the memory 230 may operate as a working memory of the processor 220.

The memory 230 may include a data buffer configured to temporarily store write data to be transmitted to the nonvolatile memory device 100 from the host 20, temporarily store read data to be transmitted to the host 20 from the nonvolatile memory device 100, or both. That is, the memory 230 may operate as a buffer memory of the processor 220.

The memory interface 240 may control the nonvolatile memory device 100 according to the control of the processor 220. The memory interface 240 may be referred to as a memory controller. The memory interface 240 may provide control signals to the nonvolatile memory device 100. The control signals may include a command, an address, and an operation control signal, and the like for controlling the nonvolatile memory device 100. The memory interface 240 may provide the nonvolatile memory device 100 with data stored in the data buffer or store data transmitted from the nonvolatile memory device 100 in the data buffer.

FIG. 2 illustrates a configuration of a data storage region included in the nonvolatile memory device 100 in accordance with an embodiment of the present disclosure.

Referring to FIG. 2, the nonvolatile memory device 100 may include a plurality of dies 210a and 210b sharing a channel CH electrically coupled to the controller 200. Each of the plurality of dies 210a and 210b may include a plurality of planes 212a and 212b sharing a way 211 electrically coupled to the channel CH. Each of the plurality of planes 212a and 212b may include a plurality of page groups each having a plurality of pages. A page may be a minimum unit of a storage region, into which data is written or from which data is read. A bundle of a plurality of page groups, on which an erase operation is discretely performed, may be referred to as a memory block. A group of a plurality of memory blocks that is regarded as a single memory block is referred to as a super block. Although the data storage region within the nonvolatile memory device 100 may be any one among a die, a plane, a super block, a memory block, the page and a page group, the data storage region hereinafter may be a page unless stated otherwise.

FIG. 3 is a flowchart illustrating an operation 300 of the memory system 10 in accordance with an embodiment of the present disclosure. The operation 300 may be performed by the controller 200 of FIG. 1. Referring to FIG. 3, the controller 200 in step S310 may detect a first copy event. The first copy event may be receiving, from the host 20, a command instructing that data stored in a first logical address be copied into a second logical address. In other words, the first copy event may be receiving, from the host 20, a command instructing an operation of changing a logical address corresponding to data.

In an embodiment, the first copy event may occur when a file system of the host 20 performs a garbage collection operation, a migration operation and so forth.

In step S315, the controller 200 may determine, in response to the first copy event, whether or not a second copy event of storing data, which is stored in a first data storage region having a first physical address mapped to the first logical address, into another data storage region is to occur. The second copy event may be a copy operation involved with an internal operation or a background operation such as a garbage collection operation, a wear levelling operation, a read reclaim operation and so forth. In step S320, when the controller 200 determines that the second copy event will occur, the process 300 proceeds to S340; otherwise, the process 300 proceeds to S330.

In an embodiment, the controller 200 may determine that the second copy event will not occur when a number of invalid pages within a memory block including the first data storage region is under a first threshold. In an embodiment, the controller 200 may determine that the second copy event will occur when the number of invalid pages within the memory block including the first data storage region is the first threshold or greater. The first threshold may be a threshold number of invalid pages to trigger a garbage collection operation.

In an embodiment, the controller 200 may determine that the second copy event will not occur when a number of erase operations performed on a memory block including the first data storage region is under a second threshold. In an embodiment, the controller 200 may determine that the second copy event will occur when the number of erase operations performed on the memory block including the first data storage region is the second threshold or greater. The second threshold may be a threshold number of erase operations performed on a memory block to trigger a wear levelling operation on the memory block.

In an embodiment, the controller 200 may determine that the second copy event will not occur when an occurrence frequency of an error during a read operation on the first data storage region or a number of errors occurring during a read operation on the first data storage region is under a third threshold. In an embodiment, the controller 200 may determine that the second copy event will occur when the occurrence frequency of an error during a read operation on the first data storage region or the number of errors occurring during a read operation on the first data storage region is the third threshold or greater. The third threshold may be a threshold occurrence frequency of an error or a threshold number of errors to trigger a read reclaim operation on the first data storage region.

In step S330, when the process 300 has determined that the second copy event will not occur, the controller 200 may change the logical address mapped to the first physical address, which is a physical address representing the first data storage region, from the first logical address to the second logical address and may invalidate the first logical address. In other words, the controller 200 may map the first physical address, which is originally mapped to the first logical address, to the second logical address and may invalidate the first logical address.

That is, the controller 200 may change, in response to the first copy event, mapping information corresponding to data without substantial copying of data. Therefore, the host 20 may regard the data, which originally corresponds to the first logical address, as currently corresponding to the second logical address.

In step S340, when the process 300 has determined that the second copy event will occur, the controller 200 may copy data from the first data storage region into a second data storage region as part of the processing of the second copy event. That is, when the process 300 determines that an internal operation or a background operation (such as a garbage collection operation, a wear levelling operation, a read reclaim operation and so forth) is to be performed on the first data storage region, the controller 200 may process the first copy event through the internal operation or the background operation.

In step S340, in response to the second copy event occurring, the controller 200 may control the nonvolatile memory device 100 to read data from the first data storage region and store the read data into the second data storage region having the second physical address. The controller 200 may map the second physical address to the second logical address.

In an embodiment, when the process 300 determines that the second copy event will occur, the controller 200 may await the occurrence of the second copy event and then process the first copy event as part of processing the second copy event.

In an embodiment, when the process 300 determines that the second copy event will occur, the controller 200 may generate the second copy event as soon as possible and then process the first copy event as part of performing the second copy event. For example, the controller 200 may advance the occurrence of the second copy event by controlling the nonvolatile memory device 100 to preferentially perform an internal operation or a background operation involving the second copy event such as a garbage collection operation, a wear levelling operation, a read reclaim operation and so forth.

FIG. 4 illustrates an operation of the memory system 10 in accordance with an embodiment of the present disclosure.

FIG. 4 illustrates a mapping table indicating a mapping relationship between logical addresses and physical addresses.

FIG. 4(a) illustrates the mapping table before the first copy event occurs. The first logical address LBA 1 may be mapped to the first physical address PPN 1. Hereinafter, description will be made under assumption that first data is stored in a data storage region having the first physical address PPN 1.

FIG. 4(b) illustrates the mapping table after the first copy event is processed at step S330 of FIG. 3 when it has been determined at steps S315 and S320 that the second copy event will not occur. The memory system 10 may map the first physical address PPN 1, which is originally mapped to the first logical address LBA 1, to the second logical address LBA 2 and may invalidate the first logical address LBA 1. That is, the controller 200 may process the first copy event without substantial copying operations by changing only the mapping relationship between the logical address and the physical address.

FIG. 4(c) illustrates the mapping table after the first copy event is processed as part of processing the second copy event at step S340 when it has been determined at steps S315 and S320 that the second copy event will occur. The memory system 10 may read the first data from the data storage region having the first physical address PPN 1 and may store the read first data into the data storage region having the second physical address PPN 2. The memory system 10 may map the second physical address PPN 2 to the second logical address LBA 2. The memory system 10 may invalidate the first logical address LBA 1 and the first physical address PPN 1. That is, the controller 200 may perform a copy operation only once by processing the first copy event as part of processing the second copy event.

FIG. 5 is a diagram illustrating a configuration of a data processing system including a solid state drive (SSD) in accordance with an embodiment of the present disclosure. Referring to FIG. 5, a data processing system 2000 may include a host 2100 and a solid state drive (SSD) 2200.

The SSD 2200 may include a controller 2210, a buffer memory device 2220, nonvolatile memory devices 2231, 2232, . . . 223n, a power supply 2240, a signal connector 2250, and a power connector 2260.

The controller 2210 may control overall operation of the SSD 2200. The controller 2210 may be implemented and operate in the substantially same way as the controller 200 of FIG. 1.

The buffer memory device 2220 may temporarily store data to be stored in the nonvolatile memory devices 2231 to 223n. Further, the buffer memory device 2220 may temporarily store data read out from the nonvolatile memory devices 2231 to 223n. The data temporarily stored in the buffer memory device 2220 may be transmitted to the host 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be electrically coupled to the controller 2210 through a plurality of channels CH1, CH2, . . . CHn, respectively. One or more nonvolatile memory devices may be coupled to a single channel. The nonvolatile memory devices coupled to a single channel may be coupled to the same signal bus and data bus.

The power supply 2240 may provide the inside of the SSD 2200 with power PWR inputted through the power connector 2260. The power supply 2240 may include an auxiliary power supply 2241. The auxiliary power supply 2241 may supply power to allow the SSD 2200 to be properly terminated when sudden power-off (SPO) occurs. The auxiliary power supply 2241 may include large capacity capacitors capable of charging the power PWR.

The controller 2210 may exchange a signal SGL with the host 2100 through the signal connector 2250. The signal SGL may include a command, an address, data, and the like. The signal connector 2250 may be configured as any of various types of connectors according to an interface scheme between the host 2100 and the SSD 2200.

Figure 6:
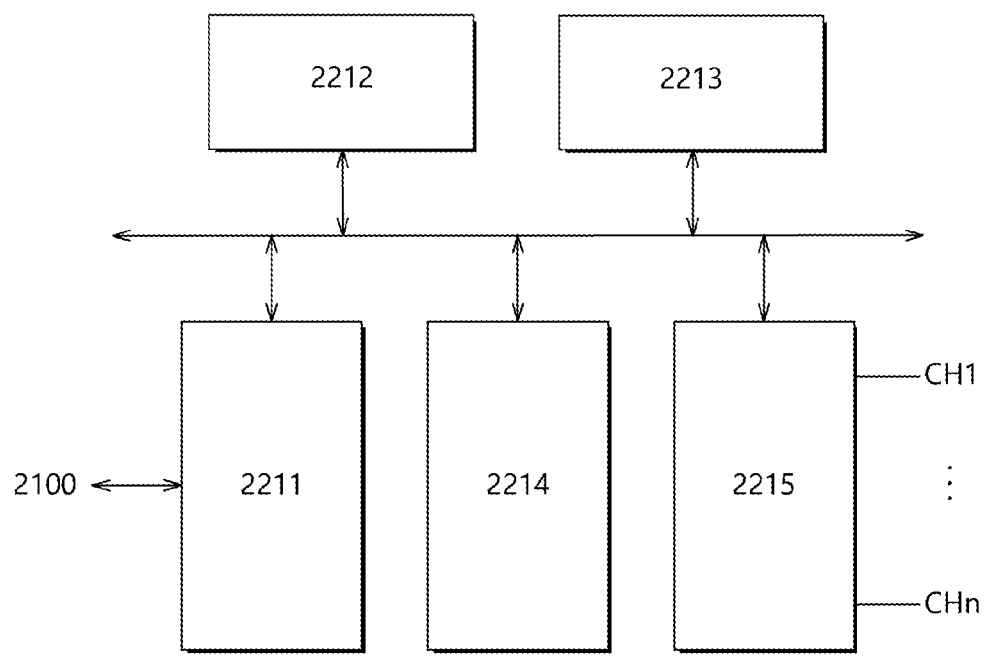
FIG. 6 illustrates a configuration of a controller, such as that illustrated in FIG. 5.

FIG. 6 is a diagram illustrating a configuration of the controller 2210 illustrated in FIG. 5 according to an embodiment. The controller 2210 may include a host interface 2211, a control component 2212, a random access memory 2213, an error correction code (ECC) component 2214, and a memory interface 2215.

The host interface 2211 may perform interfacing between the host 2100 and the SSD 2200 according to a protocol of the host 2100. For example, the host interface 2211 may communicate with the host 2100 through any of the following protocols: secure digital (SD), universal serial bus (USB), multi-media card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI Express (PCI-E), universal flash storage (UFS), and the like. In addition, the host interface 2211 may perform a disk emulating function so that the host 2100 recognizes the SSD 2200 as a general-purpose data storage system, for example, a hard disk drive (HDD).

The control component 2212 may parse and process the signal SGL provided from the host 2100. The control component 2212 may control operations of internal function blocks according to firmware or software for driving the SSD 2200. The random access memory 2213 may operate as a working memory for use when performing such firmware or software.

The ECC component 2214 may generate parity data for data to be transmitted to the nonvolatile memory devices 2231 to 223n. The generated parity data may be stored, along with the data, in the nonvolatile memory devices 2231 to 223n. The ECC component 2214 may detect errors of data read out from the nonvolatile memory devices 2231 to 223n based on the parity data. When the detected errors are within a correctable range, the ECC component 2214 may correct the detected errors.

The memory interface 2215 may provide control signals such as commands and addresses to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read out from the nonvolatile memory devices 2231 to 223n to the buffer memory device 2220.

Figure 7:
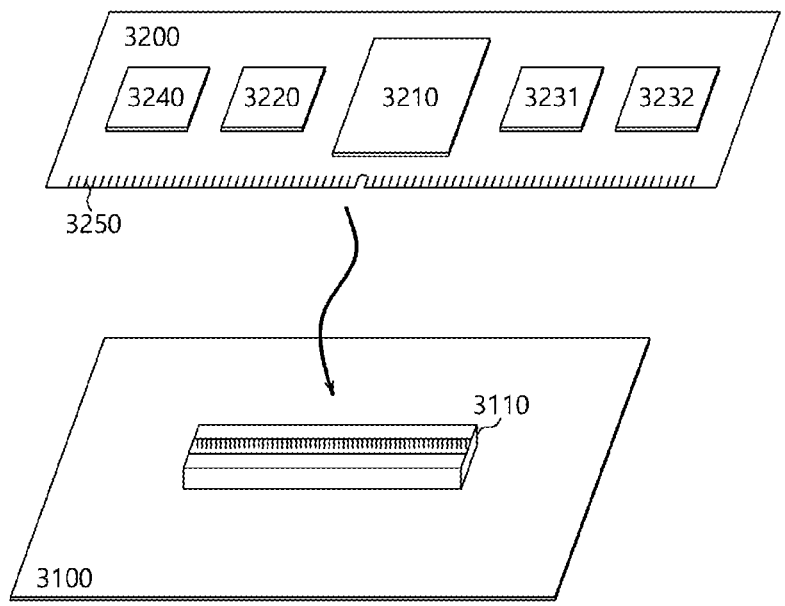
FIG. 7 illustrates a data processing system including a memory system in accordance with an embodiment of the present disclosure.

FIG. 7 is a diagram illustrating a configuration of a data processing system including a memory system in accordance with an embodiment of the present disclosure. Referring to FIG. 7, a data processing system 3000 may include a host 3100 and a memory system 3200.

The host 3100 may be configured in the form of a board such as a printed circuit board. Although not shown in FIG. 7, the host 3100 may include internal function blocks for performing functions of a host.

The host 3100 may include a connection terminal 3110 such as a socket, a slot, or a connector. The memory system 3200 may be mounted on the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control overall operation of the memory system 3200. The controller 3210 may be configured in substantially same manner as the controller 2210 shown in FIG. 6.

The buffer memory device 3220 may temporarily store data to be stored in the nonvolatile memory devices 3231 and 3232. Further, the buffer memory device 3220 may temporarily store data read out from the nonvolatile memory devices 3231 and 3232. The data temporarily stored in the buffer memory device 3220 may be transmitted to the host 3100 or the nonvolatile memory devices 3231 and 3232 according to control of the controller 3210.

The nonvolatile memory devices 3231 and 3232 may be used as storage media of the memory system 3200.

The PMIC 3240 may provide the internal components of the memory system 3200 with power inputted through the connection terminal 3250. The PMIC 3240 may manage the power of the memory system 3200 according to control of the controller 3210.

The connection terminal 3250 may be electrically coupled to the connection terminal 3110 of the host 3100. Through the connection terminal 3250, signals such as commands, addresses, data and the like, and power may be transferred between the host 3100 and the memory system 3200. The connection terminal 3250 may be configured as any of various types depending on an interface scheme between the host 3100 and the memory system 3200. The connection terminal 3250 may be disposed on or in any side of the memory system 3200.

Figure 8:
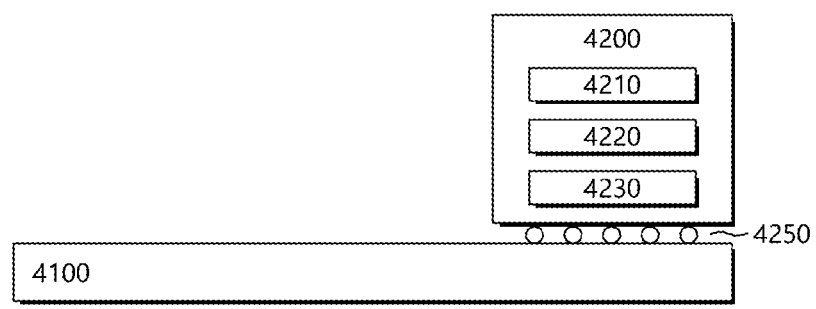
FIG. 8 illustrates a data processing system including a memory system in accordance with an embodiment of the present disclosure.

FIG. 8 is a diagram illustrating a configuration of a data processing system including a memory system in accordance with an embodiment of the present disclosure. Referring to FIG. 8, the data processing system 4000 may include a host 4100 and a memory system 4200.

The host 4100 may be configured in the form of a board such as a printed circuit board. Although not shown in FIG. 8, the host 4100 may include internal function blocks for performing functions of a host.

The memory system 4200 may be configured in the form of a package of a surface-mounting type. The memory system 4200 may be mounted on the host 4100 through solder balls 4250. The memory system 4200 may include a controller 4210, a buffer memory device 4220, and a nonvolatile memory device 4230.

The controller 4210 may control overall operation of the memory system 4200. The controller 4210 may be configured in substantially same manner as the controller 2210 shown in FIG. 6.

The buffer memory device 4220 may temporarily store data to be stored in the nonvolatile memory device 4230. Further, the buffer memory device 4220 may temporarily store data read out from the nonvolatile memory device 4230. The data temporarily stored in the buffer memory device 4220 may be transmitted to the host 4100 or the nonvolatile memory device 4230 according to control of the controller 4210.

The nonvolatile memory device 4230 may be used as a storage medium of the memory system 4200.

Figure 9:
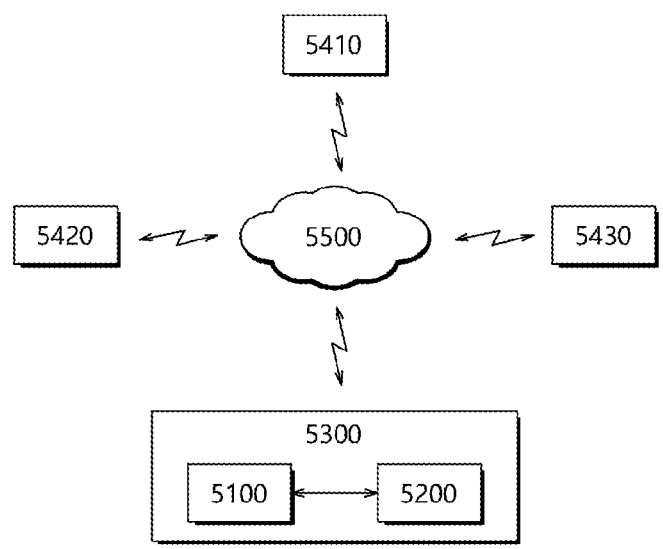
FIG. 9 illustrates a network system including a memory system in accordance with an embodiment of the present disclosure.

FIG. 9 is a diagram illustrating a configuration of a network system 5000 including a memory system in accordance with an embodiment of the present disclosure. Referring to FIG. 9, the network system 5000 may include a server system 5300 and a plurality of client systems 5410 to 5430 which are electrically coupled to each other through a network 5500.

The server system 5300 may service data in response to requests from the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host 5100 and a memory system 5200. The memory system 5200 may be configured as the memory system 10 illustrated in FIG. 1, the SSD 2200 illustrated in FIG. 5, the memory system 3200 illustrated in FIG. 7, the memory system 4200 illustrated in FIG. 8, or combinations thereof.

While certain embodiments have been described above, it will be understood to those skilled in the art that the embodiments described are by way of example only. Accordingly, the controller, memory system and operating method thereof should not be limited based on the described embodiments. Rather, the controller, memory system and operating method thereof described herein should only be limited in light of the claims that follow when taken in conjunction with the above description and accompanying drawings.

What is claimed is:

1. A method of a controller for controlling a nonvolatile memory device including a plurality of data storage regions, the method comprising:

determining, in response to a first copy event of receiving from a host a command instructing copy of data from a first logical address into a second logical address, whether a second copy event of copying the data from a first data storage region having a first physical address mapped to the first logical address into a data storage region having another physical address will occur; and in response to determining that the second copy event will not occur, changing a logical address mapped to the first physical address from the first logical address to the second logical address and invalidating the first logical address.

2. The method of claim 1, wherein the second copy event occurs due to a garbage collection operation, a wear levelling operation or a read reclaim operation.

3. The method of claim 1, wherein determining whether the second copy event will occur includes determining that the second copy event will not occur when a number of invalid pages within a memory block including the first data storage region is under a threshold.

4. The method of claim 1, wherein determining whether the second copy event will occur includes determining that the second copy event will not occur when a number of erase operations performed on a memory block including the first data storage region is under a threshold.

5. The method of claim 1, wherein determining whether the second copy event will occur includes determining that the second copy event will not occur when a number of errors occurring during a read operation on the first data storage region is under a threshold.

6. The method of claim 1, further comprising:
in response to determining that the second copy event will occur, mapping a second physical address to the second logical address and copying the data from the first data storage region into a second data storage region having the second physical address.

7. A memory system comprising:
a nonvolatile memory device including a plurality of data storage regions; and
a controller configured to control the nonvolatile memory device,
wherein the controller is configured to:
determine, in response to a first copy event of receiving from a host a command instructing copy of data from a first logical address into a second logical address, whether a second copy event of copying the data from a first data storage region having a first physical address mapped to the first logical address into a data storage region having another physical address will occur; and
in response to determining that the second copy event will not occur, change a logical address mapped to the first physical address from the first logical address to the second logical address and invalidate the first logical address, when the second copy event is predicted not to occur.

8. The memory system of claim 7, wherein the second copy event occurs due to a garbage collection operation, a wear levelling operation or a read reclaim operation.

9. The memory system of claim 7, wherein the controller determines that the second copy event will not occur when a number of invalid pages within a memory block including the first data storage region is under a threshold.

10. The memory system of claim 7, wherein the controller determines that the second copy event will not occur when a number of erase operations performed on a memory block including the first data storage region is under a threshold.

11. The memory system of claim 7, wherein the controller determines that the second copy event will not occur when a number of errors occurring during a read operation on the first data storage region is under a threshold.

12. The memory system of claim 7, wherein the controller is further configured to:
in response to determining that the second copy event will occur, map a second physical address to the second logical address and controls the nonvolatile memory device to read the data from the first data storage region and store the read data into a second data storage region having the second physical address.

13. A memory system comprising:
a nonvolatile memory device including a plurality of memory blocks each having a plurality of data storage regions; and
a controller configured to, in response to a command instructing change of a logical address corresponding to data from a first logical address to a second logical address, determine whether a copy event on the data will occur; and, in response to determining that the copy event will not occur, map a first physical address that is mapped to the first logical address to the second logical address and invalidate the first logical address.

14. The memory system of claim 13, wherein the controller determines that the copy event will not occur when a number of invalid pages within a memory block including a data storage region having the first physical address is under a threshold.

15. The memory system of claim 13, wherein the controller determines that the copy event will not occur when a number of erase operations performed on a memory block including a data storage region having the first physical address is under a threshold.

16. The memory system of claim 13, wherein the controller determines that the copy event will not occur when a number of errors occurring during a read operation on a data storage region having the first physical address is under a threshold.

17. The memory system of claim 13,
wherein the controller determines whether the copy event will occur by determining whether to perform an internal operation, and
wherein the internal operation is a garbage collection operation, a wear levelling operation or a read reclaim operation.

18. The memory system of claim 17, wherein, when performing the internal operation, the controller controls the nonvolatile memory device to read the data from a data storage region having a first physical address mapped to the first logical address and store the read data into a data storage region having a second physical address and maps the second physical address to the second logical address.

* * * * *